US 6,540,477 B2

(12) United States Patent
Glynn et al.

(10) Patent No.: US 6,540,477 B2
(45) Date of Patent: Apr. 1, 2003

(54) TURBINE COOLING CIRCUIT

(75) Inventors: Christopher Charles Glynn, Hamilton, OH (US); Thomas Tracy Wallace, Maineville, OH (US); Ronald Arthur Dickman, Indian Springs, OH (US); Monty Lee Shelton, Loveland, OH (US)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 09/862,039

(22) Filed: May 21, 2001

(65) Prior Publication Data

US 2002/0172591 A1 Nov. 21, 2002

(51) Int. Cl.⁷ .................................. F01D 5/14
(52) U.S. Cl. .................... 415/115; 415/174.5; 416/96 R
(58) Field of Search ........................ 415/115, 116, 415/174.4, 174.5; 416/95, 96 R, 96 A, 97 R (56) References Cited

U.S. PATENT DOCUMENTS 5,996,331 A * 12/1999 Palmer ...................... 60/39.02
6,183,193 B1 * 2/2001 Glasspoole et al. ......... 415/115

OTHER PUBLICATIONS

General Electric Company, "HP Blade Cooling Delivery System—A," production use or known in U.S. for more one year before May 21, 2001, filing date, single figure.

General Electric Company, "HP Blade Cooling Delivery System—B," production use or known in U.S. for more one year before May 21, 2001 filing date, single figure.

* cited by examiner

Primary Examiner—Edward K. Look
Assistant Examiner—James M McAleenan
(74) Attorney, Agent, or Firm—Rodney M. Young; Francis L. Conte (57) ABSTRACT

A turbine cooling circuit includes a flow sleeve having an aft end for adjoining the rim of a turbine disk. A seal rotor is spaced from the aft end adjacent a row of inlet holes. An inducer has an outlet disposed radially outwardly from the sleeve inlet holes. And, a seal stator surrounds the seal rotor to define a rotary seal disposed radially inwardly from the inducer outlet.

34 Claims, 4 Drawing Sheets

TURBINE COOLING CIRCUIT

The U.S. Government may have certain rights in this invention pursuant to contract number N00019-96-C-0176 awarded by the U.S. Department of the Navy.

BACKGROUND OF THE INVENTION

The present invention relates generally to gas turbine engines, and, more specifically, to turbine blade cooling.

In a gas turbine engine air is pressurized in a compressor and mixed with fuel in a combustor for generating hot combustion gases which flow downstream to a turbine which extracts energy therefrom. A high pressure turbine (HPT) first receives the hottest combustion gases for extracting energy therefrom to power the compressor. And, a low pressure turbine (LPT) follows the HPT for extracting additional energy from the combustion gases for providing output power which may be used to drive a fan disposed upstream of the compressor in a turbofan engine for powering an aircraft in flight.

The HPT includes a row of hollow turbine blades extending radially outwardly from the rim of a supporting turbine disk, with each blade having a suitable internal cooling circuit therein in which compressor air is channeled for cooling the blade being heated by the hot combustion gases during operation. The blade requires suitable cooling for maintaining the structural integrity thereof and ensuring a suitable useful life during operation.

However, the air used for cooling the turbine blades is extracted from the compressor and is therefore not used in the combustion process, and correspondingly decreases overall efficiency of the gas turbine engine. Accordingly, it is desired to reduce the amount of cooling air for maintaining engine efficiency, yet sufficient airflow must be provided for adequately cooling the blades.

The amount of required cooling air is referred to as chargeable airflow and is a primary design objective which should be minimized. However, the chargeable flow is controlled by pressure losses, air leakage, and relative temperature increase as the pressurized air is channeled from the compressor to the turbine.

The resulting turbine cooling air delivery system or circuit includes stationary or stator components from the discharge end of the compressor axially along the combustor which must cooperate with the rotating turbine disk for channeling the cooling air thereto. The individual turbine blades have bottom air inlets extending through the dovetails thereof, with the dovetails being retained in corresponding dovetail slots in the rim of the turbine disk.

A typical cooling air delivery system includes a stationary inducer for preswirling the compressor air in the direction of rotation of the turbine disk for minimizing pressure losses therebetween. Rotating impeller vanes are often located near the turbine disk for pumping the airflow through a dedicated flowpath terminating at the disk rim. And, labyrinth seals are used between the stationary inducer and the rotating disk to minimize undesirable leakage of the cooling air from its flowpath to the disk rim.

A particular dilemma in designing the turbine cooling circuit is that large exit diameter inducers are desired for reducing relative air temperature, yet the correspondingly large diameter seals require larger seal gaps and experience increased cooling air leakage adding to chargeable flow. And, since the teeth of the labyrinth seal rotate during operation, the large diameter thereof in a typical gas turbine engine application is greater than the free hoop diameter for which they would be otherwise self-supporting under their own centrifugal load.

Accordingly, the large diameter seal teeth must be supported on an integral supporting disk for withstanding the centrifugal loads generated during operation, which increases the complexity and weight of the cooling system.

Furthermore, air from the stationary inducer must be transferred to corresponding apertures rotating with the turbine disk during operation. Those rotating apertures are preferably small, have unitary aspect ratios, and large pitch spacing of about two diameters for minimizing stress in a radial hoop member in which they are found while maintaining acceptable strength for rotary operation. However, the small transfer apertures introduce corresponding pressure drops and reduce the desired swirl carryover to the rotating disk.

Accordingly, it is desired to provide a turbine cooling air delivery circuit having reduced chargeable flow while maintaining suitable durability.

BRIEF SUMMARY OF THE INVENTION

A turbine cooling circuit includes a flow sleeve having an aft end for adjoining the rim of a turbine disk. A seal rotor is spaced from the aft end adjacent a row of inlet holes. An inducer has an outlet disposed radially outwardly from the sleeve inlet holes. And, a seal stator surrounds the seal rotor to define a rotary seal disposed radially inwardly from the inducer outlet.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
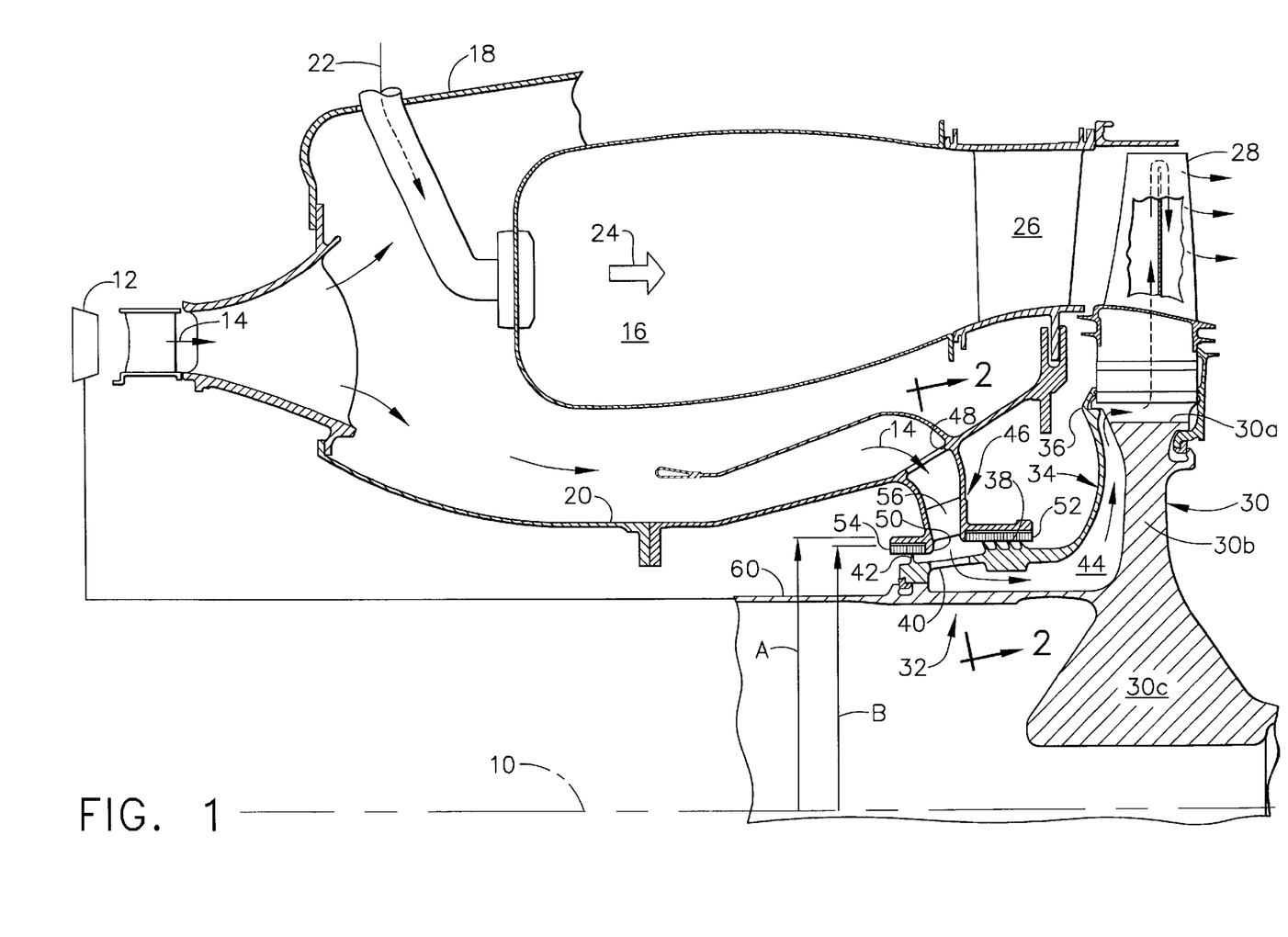
FIG. 1 is a schematic, axial sectional view through a portion of an exemplary turbofan gas turbine engine including a compressor, combustor, and cooperating high pressure turbine cooled in accordance with an exemplary embodiment of the present invention.

Illustrated schematically in FIG. 1 is a portion of an exemplary turbofan gas turbine engine configured for powering an aircraft in flight. The engine is axisymmetrical about a longitudinal or axial centerline axis 10, and includes a multistage axial compressor 12 which discharges pressurized air 14 to a diffuser disposed immediately upstream from an annular combustor 16. The combustor is disposed between a radially outer casing 18 and a radially inner casing 20.

The combustor includes fuel injectors at its dome end which inject fuel 22 into the combustor for mixing with the compressor air 14 for generating hot combustion gases 24 which are discharged at the downstream end of the combustor.

A high pressure turbine (HPT) is disposed immediately downstream from the combustor and includes an annular turbine nozzle 26 which directs the combustion gases through a row of first stage turbine rotor blades 28 extending radially outwardly from a supporting rotor disk 30. The individual blades 28 are hollow and include suitable cooling circuits therein in which a portion of the compressor discharge air 14 is channeled therethrough for providing cooling thereof.

Figure 2:
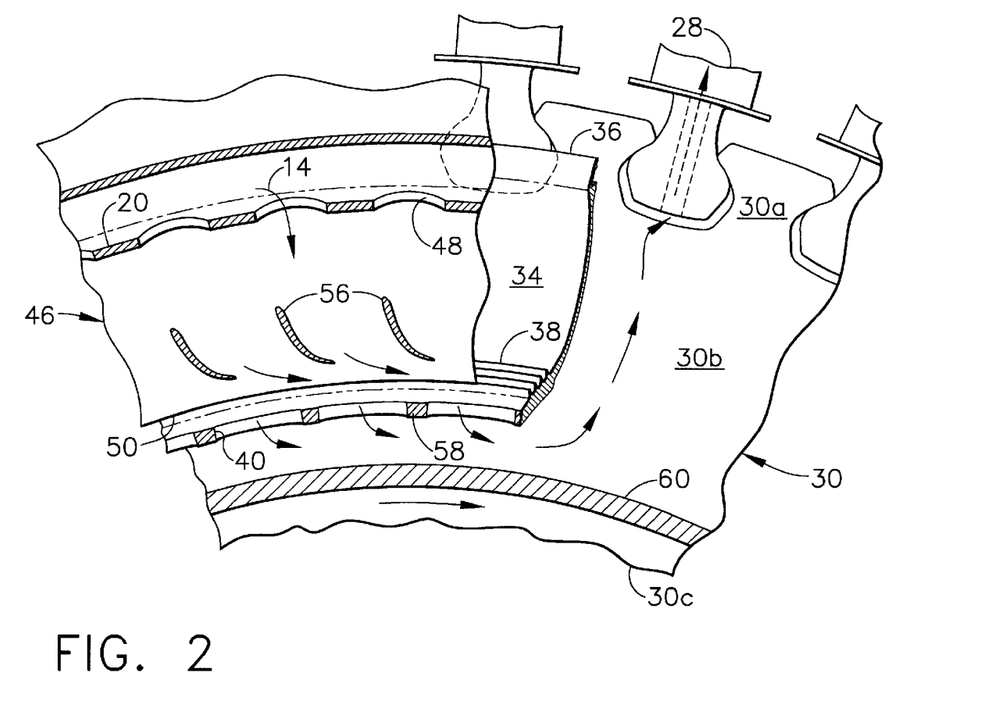
FIG. 2 is a partly sectional radial view of a portion of the turbine cooling air circuit illustrated in FIG. 1 and taken along line 2—2.

As shown in both FIGS. 1 and 2, each blade includes a suitable dovetail which is retained in a complementary dovetail slot formed in a rim 30a of the turbine disk. The disk further includes an axially narrow web 30b extending radially inwardly from the rim which terminates in a wider hub 30c to form a unitary turbine disk having sufficient strength for supporting the row of turbine blades under centrifugal force generated during operation.

The basic features of the engine described above may have any conventional configuration in which air is pressurized in the compressor 12 and mixed with fuel in the combustor for generating the combustion gases 24 which flow past the turbine blades 28 which extract energy therefrom for powering the compressor itself. The HPT may have additional stages if desired, and is typically followed by a low pressure turbine (not shown) which drives a conventional fan (not shown) disposed upstream from the compressor 12. In this exemplary turbofan configuration, the engine may be used for powering an aircraft in flight.

In accordance with the present invention, a turbine cooling circuit or system 32, as initially illustrated in FIG. 1, is provided between the compressor 12 and the first stage turbine disk 30 for channeling a portion of the compressor discharge air 14 to the turbine blades 28 for cooling thereof. Accordingly, the cooling circuit operates in combination with the compressor 12 and turbine disk 30 for providing cooling air to the blades 28 which are heated during operation from the combustion gases discharged from the combustor.

The cooling circuit 32 further includes an annular flow sleeve 34 which covers the forward side of the turbine disk radially inwardly from the rim thereof. The flow sleeve includes an aft end 36 which adjoins the forward side of the disk rim and is sealingly joined in abutment thereagainst. At an intermediate portion of the sleeve, a first seal member or rotor 38 in the preferred from of a plurality or group of four labyrinth first seal teeth are disposed and spaced forwardly from the sleeve aft end. A row of inlet holes 40 is disposed in the sleeve immediately forwardly from the first teeth 38.

The sleeve 34 preferably also includes a second seal member or rotor 42 in the preferred form of a single labyrinth seal tooth 42 disposed at the forward end of the sleeve immediately adjacent the sleeve inlet holes 40. And, the sleeve is spaced in most part from the forward side of the turbine disk to define an annular flowpath 44 extending axially between the inlet holes 40 and the disk rim 30a for channeling a portion of the compressor discharge air 14 to the blades for cooling thereof during operation.

The blades are hollow and include inlets at the bottom of the dovetails thereof which are mounted in the dovetail slots in the disk rim. The dovetail slots are disposed in flow communication with the sleeve flowpath 44 at the aft end thereof for receiving the compressor cooling air which is channeled radially upwardly through the individual blades for cooling thereof in any conventional manner.

The cooling circuit also includes an annular inducer 46 having an inlet 48 disposed in flow communication with the compressor, and an outlet 50 disposed radially outwardly from the sleeve inlet holes 40 in flow communication therewith for tangentially accelerating and discharging the compressor air therethrough.

The inducer 46 is a stationary or stator structure suitably mounted in the engine in close proximity to the sleeve inlet holes 40 which rotate during operation along with the turbine disk 30 to which they are attached. The cooling air must therefore bridge the stationary inducer outlet 50 and the rotary sleeve inlet holes 40 with minimal air leakage therebetween.

Accordingly, an annular first seal stator 52 in the form of a pad is suitably supported from and sealingly joined to the aft side of the inducer at its discharge end and surrounds the first seal rotor 38 with a relatively small clearance or gap therebetween defining a first rotary or labyrinth seal therewith.

Similarly, an annular second seal stator 54 in the form of a pad is suitably supported from and sealingly joined to the inducer 46 on the forward side of the outlet, and surrounds the second seal rotor 42 with a suitably small clearance or gap defining a second rotary or labyrinth seal therewith.

Of particular significance in the present invention is the cooperating configuration of the flow sleeve 34 and inducer 46 in which the inducer outlet 50 may have a relatively large or high radius from the centerline of the engine, while the rotary seals have a relatively small or low radius for enhanced performance, including a significant reduction in chargeable compressor airflow for cooling the turbine blades 28.

As illustrated in FIG. 1, the inducer outlet 50 is disposed at a radius A measured from the centerline axis 10 of the engine, with the maximum radius B of the two labyrinth seals being smaller than the outlet radius A. In this way, at least one, and preferably both of the labyrinth seals are disposed radially inwardly of the inducer outlet 50 at a lower radius relative thereto.

This configuration is quite significant in reducing chargeable airflow and enjoys significant additional advantages as a result thereof. In particular, the relative temperature of the cooling air 14 delivered to the turbine blades 28 is inversely related to the radius of the inducer outlet. By increasing the radius of the inducer outlet, lower relative temperature air is provided to the turbine blades, and therefore less chargeable air is required for suitably cooling the blades.

Correspondingly, the seal teeth 38,42 and the seals defined thereby are disposed at a relatively low radius radially inwardly of the inducer outlet and enjoy significant advantages. Since the seals have a low radius, they also have a correspondingly small circumference which decreases the circumferential extent of the clearance gap through which air leakage occurs during operation. Reduced air leakage reduces chargeable airflow.

Since the seal teeth rotate during operation and are subject to temperature expansion thereof, the clearance gap defined with the seal pads may be made correspondingly smaller for the low radius seals as opposed to higher radius seals. The smaller sealing gap correspondingly decreases air leakage, and thusly additionally decreases chargeable airflow.

A significant advantage attributable to the low radius seals therefore includes a preferably diskless configuration thereof which will effect better thermal matching with the supported seal stators leading to the smaller seal clearances.

Furthermore, the low radius labyrinth seals are subject to less air pressure than a high radius seal, and less pressure decreases airflow leakage and further reduces chargeable airflow.

A significant advantage of the high radius inducer 46 is the substantial increase in angular momentum of the air discharged to the flow sleeve, as compared to that available from a conventional low radius inducer. Accordingly, the sleeve flowpath 44 may be smooth and unobstructed between the sleeve inlet holes 40 and the disk rim 30a without the need for conventional impeller vanes previously used to limit flow deceleration to the disk rim. The high angular momentum air discharged through the inducer may then be decelerated through the smooth flowpath 44 to a velocity closely matching that of the disk rim for minimizing pressure losses. However, impeller vanes could be used if desired, and would be substantially shorter in length due to the high angular momentum airflow.

As shown in FIG. 1, the two groups of seal teeth 38, 42 are used on opposite sides of the inducer for confining the cooling air to flow through the sleeve inlet holes and the flowpath 44 to the disk rim. The sleeve 34 is otherwise imperforate and is sealingly joined at its opposite axial ends to provide an unobstructed flowpath 44 for channeling the cooling air to the blades with minimal pressure loss. In this configuration, the inducer outlet 50 is disposed at a larger or higher radius than preferably both of the first and second labyrinth seals defined at the corresponding teeth 38,42.

As shown in FIG. 1, the forward portion of the sleeve 34 preferably extends axially between the first and second seal teeth 38,42, and the sleeve inlet holes 40 extend radially through the sleeve in axial alignment with the inducer outlet 50 for receiving the tangentially accelerated compressor air 14 radially inwardly therefrom.

Since the forward portion of the flow sleeve 34 is disposed at a relatively small radius from the engine centerline axis, the sleeve may be configured smaller than the free hoop radius thereof at the first and second seal teeth 38,42. The free hoop radius is a conventional term up to which an annular structure is self supporting against the centrifugal loads generated during operation which generate stress. Annular structures having a radius greater than the free hoop radius require corresponding supporting disks in a manner similar to the turbine disk 30 in which the wide hub 30c is integrally formed with the rim 30a for withstanding the considerable centrifugal loads generated by the rotating blades 28 during operation.

Accordingly, the flow sleeve 34 may be relatively simple in configuration at the first and second seal teeth 38,42 with a simple cylindrical form without supporting disks or hubs. The sleeve 34 may be relatively thin except as required at its aft end 36 for joining the disk rim, and except below the two groups of seal teeth 38,42 to provide structural stiffness for stabilizing roundness in this region under occasional local rubbing between the seal rotors and stators. And, the portion of the flow sleeve 34 between the two seal rotors 38,42 may be slightly conical or cylindrical as desired.

An additional advantage of the low radius labyrinth seals is the reduction of centrifugal loads and stress in the flow sleeve which may have a forward portion that is generally cylindrical axially between the first and second seal teeth 38,42. Cylindrical, or conical, shells have substantial three dimensional strength, and the low radius configuration of the cylindrical shell experiences less centrifugal force during operation.

The cylindrical forward portion of the flow sleeve may then transition radially outwardly from the intermediate first seal teeth 38 to the aft end 36 where it sealingly abuts the forward side of the disk rim. The inner surface of the flow sleeve defines the outer boundary of the sleeve flowpath 44 which may be relatively smooth without obstruction of the cooling air channeled therethrough during operation.

In the preferred embodiment illustrated in FIGS. 1 and 2, the flow inducer 46 is suitably supported to the aft end of the inner casing 20 radially inwardly of the combustor. The inner casing 20 extends axially between the compressor and the turbine disk and defines an inner flowpath along which a portion of the compressor discharge air is channeled. The annular inner liner of the combustor includes various film cooling holes and dilution holes through which a portion of the compressor air enters the combustor during operation. The inducer inlet 48 may be in the form of a row of corresponding inlet holes disposed in the inner casing 20 for receiving a portion of the compressor discharge air.

The inducer 46 may have any suitable form, and in the exemplary embodiment illustrated in FIGS. 1 and 2 includes a row of inducer vanes 56 extending between the inlet 48 and outlet 50 at opposite ends of the inducer. The inducer vanes are circumferentially spaced apart from each other and are suitably curved or inclined for tangentially accelerating and introducing circumferential swirl to the compressor air in the direction of rotation of the turbine disk and attached flow sleeve 34.

In this way, the compressor air from the stationary inducer 46 is preswirled thereby in the direction of rotation of the turbine disk for minimizing pressure losses as the air transitions from the stationary inducer to the rotating flow sleeve. The inducer outlet 50 is disposed in axial alignment with the sleeve inlet holes 40 for radially inwardly preswirling the compressor air into the row of radial sleeve inlet holes 40.

In the exemplary embodiment illustrated in FIGS. 1 and 2, the inducer vanes 56 are radial vanes that extend primarily only radially inwardly between the inducer inlet 48 and outlet 50 with little if any axial inclination. In this way, a substantially straight flowpath is defined radially inwardly through the inducer and into the sleeve inlet holes 40, with the cooling air then being channeled radially upwardly along the inner surface of the flow sleeve to the disk rim.

Figure 3:
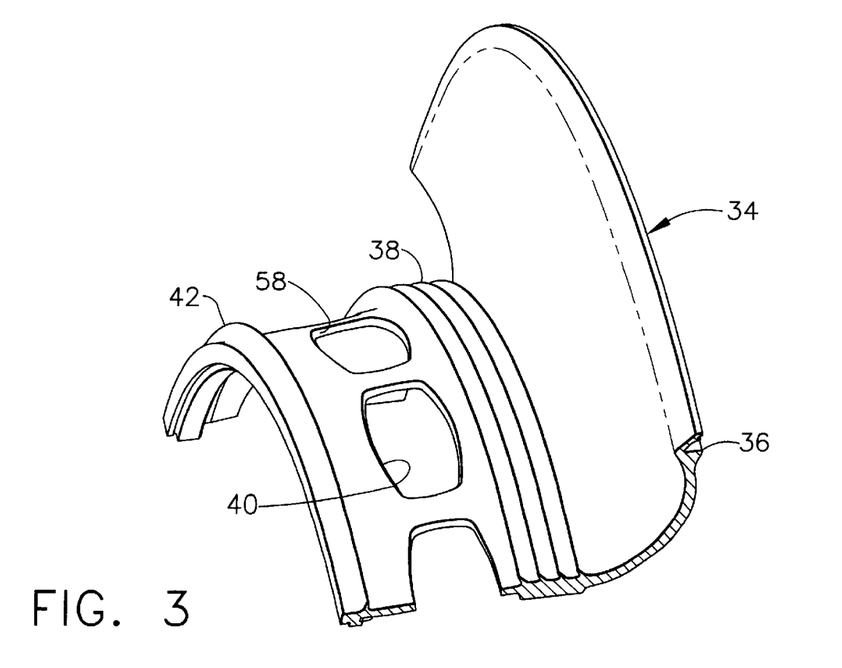
FIG. 3 is an isometric view of a portion of the flow sleeve illustrated in FIGS. 1 and 2 in accordance with an exemplary embodiment.

As shown in more detail in FIG. 3, the sleeve inlet holes 40 are preferably oval circumferentially around the sleeve for maximizing their available flow area through which the preswirled compressor air is channeled.

The effective flow area of the inlet holes 40 may be further increased by circumferentially separating the holes with axial ligaments 58 which are circumferentially narrower than the sleeve inlet holes. The sleeve inlet holes may be generally rectangular in racetrack form, and longer in their circumferential length around the perimeter of the sleeve than their width in the axial direction. The axial ligaments 58 join and support the annular second seal teeth 42 at the forward end of the sleeve to the imperforate remainder of the sleeve at the first seal teeth 38. And, the individual inlet holes 40 join the ligaments 58 at suitable fillets therewith.

Since the cylindrical shell in which the sleeve inlet holes 40 are formed has a relatively low radius it experiences relatively low centrifugal loads during operation. This permits substantially large area inlet holes 40 without unacceptably high stress during operation which would adversely affect the useful life of the sleeve.

Conventional transfer apertures on a typical gas turbine engine rotating component are small and typically spaced apart from each other at a relatively high pitch spacing equal to about two diameters. The low radius sleeve inlet holes 40 may be made substantially larger in size and with closer pitch spacing than would be otherwise possible in conventional turbine cooling air delivery systems. The inlet holes 40 may be made as large as needed to avoid significant pressure losses, while the several ligaments 58 support the second seal rotor 42 to the remainder of the flow sleeve.

Another advantage of the low radius inlet holes 40 illustrated in FIG. 3 is that they may be formed in a relatively thin shell for obtaining relatively high swirl carryover from the inducer while maintaining high angular momentum of the swirled air. High swirl carryover is the ability of the inlet holes 40 to transfer the preswirled air discharged from the inducer without appreciably degrading the preswirl. Each oval inlet hole 40 has an effective diameter corresponding with an equal area circular hole which is substantially greater than the radial thickness of the sleeve around the holes. This thin profile of the inlet holes 40, and their separating ligaments 58, ensures relatively high swirl carryover from the inducer for further enhancing performance of the delivery circuit for further reducing chargeable airflow.

The turbine disk 30 illustrated in FIG. 1 may be joined to the rotor of the compressor 12 in any conventional manner. In the preferred embodiment illustrated in FIG. 1, a rotor shaft 60 is fixedly joined to the turbine disk 30 and the rotor of the compressor 12 for transferring power from the disk to rotate the compressor during operation. The flow sleeve 34 may then be fixedly retained at the forward end thereof to a portion of the rotor shaft 60 using a split retaining ring similar to those typically used in retaining blades on turbine disks, or the sleeve may be suitably bolted to the shaft.

In the preferred embodiment illustrated in FIG. 1, the rotor shaft 60 is integrally joined to the turbine disk between the web 30b and hub 30c thereof and extends axially forwardly in cylindrical form. The flow sleeve 34 is preferably a unitary annular member joined at its opposite forward and aft ends to the rotor shaft and disk rim, respectively.

In this configuration of the rotor shaft, the flow sleeve is preferably cylindrical in its forward portion around the cylindrical rotor shaft and transitions radially outwardly over the forward face of the disk. The resulting sleeve flowpath 44 commences as a cylindrical annulus which turns radially outwardly into a radial annulus for smoothly channeling the cooling air radially outwardly to the dovetail slots for flow inside the individual turbine blades.

The enhanced performance of the turbine cooling air delivery circuit 32 illustrated in FIG. 1 is due in most part to the high radius inducer outlet with cooperating low radius labyrinth seals and sleeve inlet holes 40. In FIG. 1, the inducer vanes 56 are oriented radially.

Figure 4:
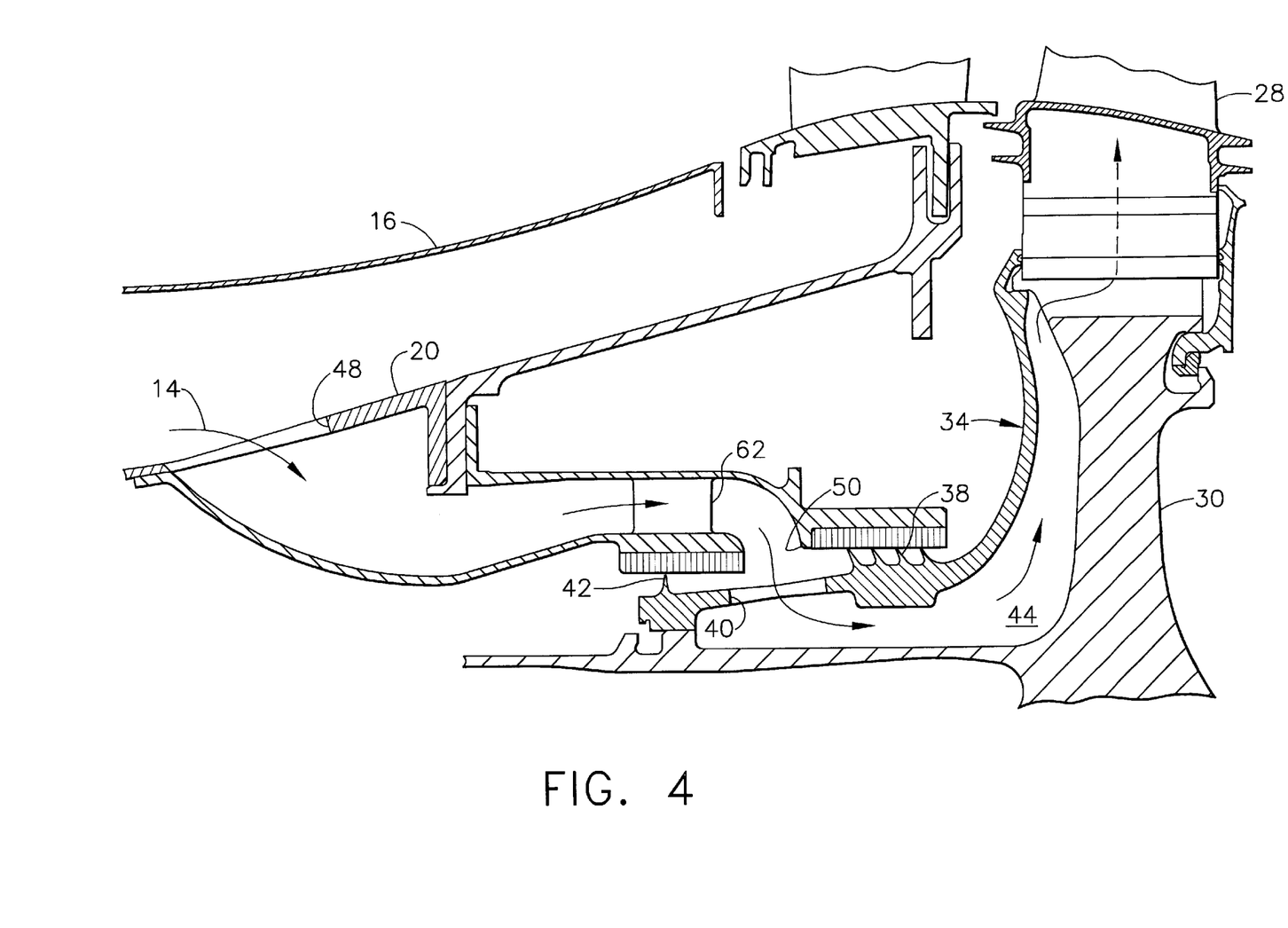
FIG. 4 is an axial sectional view, like FIG. 1, of an alternate embodiment of the cooling circuit including an axial flow inducer cooperating with the flow sleeve.

FIG. 4 illustrates an alternate embodiment of invention wherein the inducer may have axial inducer vanes 62 which extend primarily only axially between the inducer inlet 48 and outlet 50. The inducer inlet 48 may be disposed through the inner casing 20 at a more forwardly location than that illustrated in FIG. 1. And, the inducer outlet 50 includes an angular elbow transition from the aft end of the axial vanes 62 to turn the cooling air 14 radially inwardly above the sleeve inlet holes 40.

The inducer may also have other suitable forms. For example, instead of using vanes to define the inducer flow passages, those passages may be defined by cylindrical, conical, or trumpet shaped apertures through an annular member. These apertures would be suitably inclined in the circumferential direction to swirl the air in the rotational direction of the turbine disk.

Furthermore, the rotary seals defined by the flow sleeve may also have different forms. Instead of the labyrinths seals, suitable brush seals may be used.

Figure 5:
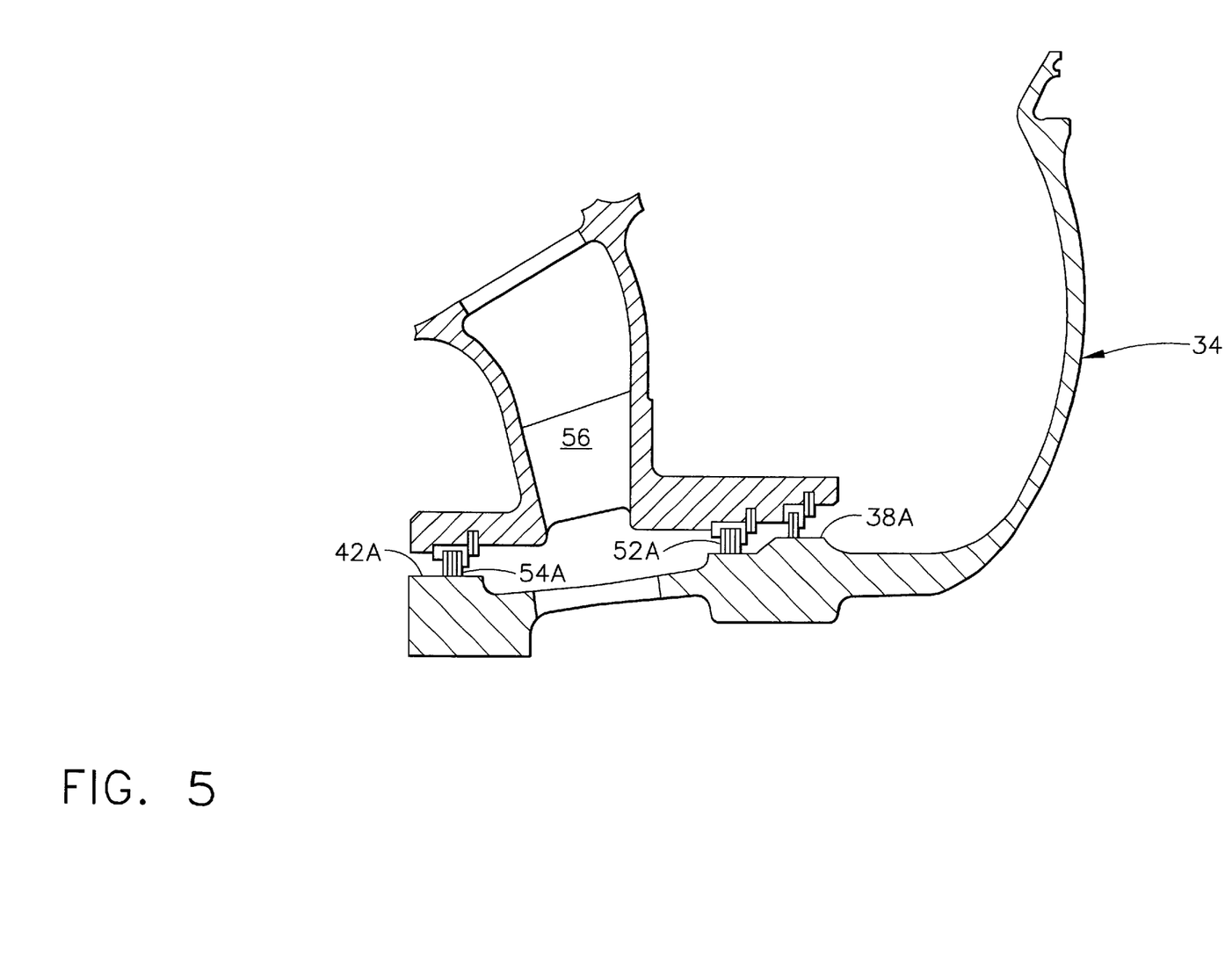
FIG. 5 is an alternate embodiment using brush seals.

FIG. 5 illustrates one embodiment in which the first seal rotor 38A is defined by a pair of cylindrical lands which cooperate with the first seal stator 52A in the form of a pair of brush arrays to define a conventional two-stage brush seal. Similarly, the second seal rotor 42A is defined by a cylindrical land which cooperates with the second seal stator 54A in the form of another brush array to define a single stage brush seal.

Like the labyrinth seals described above, the brush seals also have low radius and enjoy the same benefits.

In the various embodiments illustrated in the Figures, the inducer outlet is at a relatively high radius compared to the relatively low radius of the rotary seals and inlet holes of the flow sleeve. And, these embodiments enjoy the substantial advantages of this configuration for substantially reducing chargeable airflow for cooling the turbine blades during operation.

The unitary flow sleeve 34 is relatively simple in configuration, strong and self supporting, and thin and lightweight. Relatively cool compressor air is delivered to the turbine blades with relatively low aerodynamic losses and relatively high swirl carryover through the flow sleeve. The low radius rotary seals enjoy a substantial reduction in airflow leakage therethrough during operation. And, the relatively thin flow sleeve and low radius of the seal rotors thereon enjoy superior transient thermal matching with the seal stators supported from the stationary inducer. Better thermal matching of the seal rotors and cooperating seal stators reduces the clearance therebetween during transient operation for further reducing overall chargeable airflow.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine cooling circuit comprising:
    a compressor for pressurizing air;
    a combustor disposed in flow communication with said compressor for mixing fuel with said air to generate combustion gases;
    a turbine disk disposed downstream from said combustor and joined to said compressor, and including a row of hollow turbine blades extending from a rim thereof;
    a flow sleeve having an aft end adjoining said disk rim, a first seal rotor spaced forwardly from said aft end, and a row of oval inlet holes disposed forwardly from said first seal rotor, and said sleeve being spaced from said disk to define an annular flowpath extending between said inlet holes and said disk rim for channeling said compressor air to said blades;
    an inducer having an inlet disposed in flow communication with said compressor, and an outlet disposed radially outwardly from said sleeve inlet holes in flow communication therewith; and
    a first seal stator sealingly joined to said inducer and surrounding said first seal rotor to define a first rotary seal therewith disposed radially inwardly of said inducer outlet.

2. A circuit according to claim 1 wherein said sleeve inlet holes are separated circumferentially by corresponding axial ligaments being circumferentially narrower than said sleeve inlet holes.

3. A circuit according to claim 2 wherein:
said sleeve further comprises a second seal rotor at a forward end thereof adjacent said sleeve inlet holes; and
a second seal stator is sealingly joined to said inducer and surrounds said second seal rotor to define a second rotary seal therewith.

4. A circuit according to claim 2 wherein said inducer outlet is disposed at a larger radius than both said first and second rotary seals.

5. A circuit according to claim 3 wherein said sleeve extends axially between said first and second seal rotors and said sleeve inlet holes extend radially therethrough in alignment with said inducer outlet for receiving said compressor air radially inwardly therefrom.

6. A circuit according to claim 4 wherein said sleeve flowpath is unobstructed between said sleeve inlet holes and said disk rim.

7. A circuit according to claim 4 wherein said sleeve is cylindrical at said first and second seal rotors without supporting disks.

8. A circuit according to claim 4 wherein said sleeve is smaller than a free hoop radius thereof at said first and second seal rotors.

9. A circuit according to claim 4 further comprising:
an inner casing disposed radially inwardly of said combustor and axially between said compressor and turbine disk for channeling said compressor air; and
said inducer inlet is disposed in said inner casing for receiving said compressor air therefrom.

10. A circuit according to claim 8 wherein said inducer further comprises a row of radial inducer vanes extending radially between said inducer inlet and outlet for preswirling said compressor air radially into said sleeve inlet holes.

11. A circuit according to claim 9 wherein said inducer further comprises a row of axial inducer vanes extending axially between said inducer inlet and outlet, and said inducer outlet includes an elbow transitioning axially to radially from said inducer vanes for preswirling said compressor air radially into said sleeve inlet holes.

12. A circuit according to claim 5 wherein said sleeve inlet holes are longer in circumferential length around said sleeve than wide in axial width.

13. A circuit according to claim 11 wherein said sleeve inlet holes each has an effective diameter greater than the thickness of said sleeve around said holes for effecting a correspondingly high swirl carryover from said inducer.

14. A circuit according to claim 4 further comprising:
a rotor shaft fixedly joined to said turbine disk and compressor for transferring power from said disk to rotate said compressor; and
said sleeve is fixedly retained at said forward end thereof to said shaft.

15. A circuit according to claim 14 wherein:
said turbine disk further comprises a web extending radially inwardly from said rim, and a wider hub extending radially inwardly from said web;
said rotor shaft is fixedly joined to said turbine disk between said web and hub; and
said sleeve is a unitary annular member joined at opposite forward and aft ends to said shaft and rim, respectively.

16. A circuit according to claim 15 wherein said sleeve is generally cylindrical axially between said first and second seal rotors and transitions radially outwardly from said first seal rotor to said aft end.

17. A cooling circuit for channeling pressurized air from a compressor to hollow turbine blades mounted on a turbine disk comprising:
a unitary flow sleeve having an aft end for adjoining said disk at a rim thereof, a first seal rotor spaced forwardly from said aft end, a row of oval inlet holes disposed forwardly from said first seal rotor, and a second seal rotor disposed forwardly of said inlet holes at an opposite forward end of said sleeve;
an inducer having an outlet disposed radially outwardly from said sleeve inlet holes; and
first and second seal stators sealingly joined to opposite sides of said inducer and surrounding said first and second seal rotors, respectively, to define corresponding first and second labyrinth seals therewith disposed radially inwardly from said inducer outlet.

18. A circuit according to claim 17 wherein said sleeve extends axially between said first and second seal rotors, and said sleeve inlet holes extend radially therethrough in alignment with said inducer outlet for receiving said compressor air radially inwardly therefrom.

19. A circuit according to claim 18 wherein said sleeve is cylindrical at said first and second seal rotors without supporting disks.

20. A circuit according to claim 18 wherein said sleeve is smaller than a free hoop radius thereof at said first and second seal rotors.

21. A circuit according to claim 18 wherein said inducer further comprises an inlet disposed oppositely from said outlet thereof, and a row of inducer vanes extends between said inducer inlet and outlet for preswirling said air radially into said sleeve inlet holes.

22. A circuit according to claim 21 wherein said inducer vanes extend radially between said inducer inlet and outlet.

23. A circuit according to claim 21 wherein said inducer vanes extend axially between said inducer inlet and outlet, and said inducer outlet includes an elbow transitioning axially to radially.

24. A circuit according to claim 18 wherein said sleeve inlet holes are longer in circumferential length around said sleeve than wide in axial width.

25. A circuit according to claim 24 wherein said sleeve inlet holes are separated circumferentially by corresponding axial ligaments being circumferentially narrower than said sleeve inlet holes.

26. A circuit according to claim 25 wherein said sleeve inlet holes each has an effective diameter greater than the thickness of said sleeve around said holes for effecting a correspondingly high swirl carryover from said inducer.

27. A circuit according to claim 18 wherein said sleeve is generally cylindrical axially between said first and second seal rotors and transitions radially outwardly from said first seal rotor to said aft end.

28. A turbine cooling circuit comprising:
a compressor for pressurizing air;
an inducer having an inlet disposed in flow communication with said compressor for receiving pressurized air therefrom, a row of inducer vanes disposed in flow communication with said inlet, and an outlet for discharging air swirled by said vanes;
a flow sleeve including an aft end adjoining a rim of a turbine disk from which extends a row of hollow turbine blades, and further including a row of oval inlet holes disposed axially between first and second seal rotors; and
first and second seal stators sealingly joined to opposite sides of said inducer, and surrounding said first and second seal rotors to define respective first and second rotary seals disposed radially inwardly from said inducer outlet.

29. A circuit according to claim 28 further comprising: a rotor shaft fixedly joined to said turbine disk and compressor for transferring power from said disk to rotate said compressor; and said sleeve is fixedly retained at a forward end thereof to said shaft.

30. A circuit according to claim 29 wherein said sleeve is generally cylindrical axially between said first and second seal rotors and transitions radially outwardly from said first seal rotor to said aft end.

31. A circuit according to claim 30 wherein said sleeve inlet holes are longer in circumferential length around said sleeve than wide in axial width.

32. A circuit according to claim 31 wherein:
said sleeve inlet holes are separated circumferentially by corresponding axial ligaments being circumferentially narrower than said sleeve inlet holes; and
said sleeve inlet holes each has an effective diameter greater than the thickness of said sleeve around said holes for effecting a correspondingly high swirl carry-over from said inducer.

33. A circuit according to claim 32 wherein said first and second seal rotors comprise labyrinth seal teeth, and said first and second seal stators comprise cooperating seal pads.

34. A circuit according to claim 32 wherein said first and second seal rotors comprise cylindrical seal lands, and said first and second seal stators comprise cooperating brush arrays.

* * * * *

UNITED STATES PATENT AND TRADEMARK OFFICE
CERTIFICATE OF CORRECTION

PATENT NO. : 6,540,477 B2
DATED : April 1, 2003
INVENTOR(S) : Glynn et al.

It is certified that error appears in the above-identified patent and that said Letters Patent is hereby corrected as shown below:

Column 9,
Line 8, delete "2" and substitute -- 3 --.
Line 10, delete "3" and substitute -- 4 --.
Line 15, delete "4" and substitute -- 5 --.
Line 18, delete "4" and substitute -- 5 --.
Line 21, delete "4" and substitute -- 5 --.
Line 23, delete "4" and substitute -- 5 --.
Line 29, delete "8" and substitute -- 9 --.
Line 42, delete "11" and substitute -- 12 --.
Line 46, delete "4" and substitute -- 5 --.

Signed and Sealed this

Ninth Day of September, 2003

JAMES E. ROGAN
*Director of the United States Patent and Trademark Office*